F. WINDHOFF.
BELT TENSIONING DEVICE.
APPLICATION FILED OCT. 12, 1909.
945,661.
Patented Jan. 4, 1910.
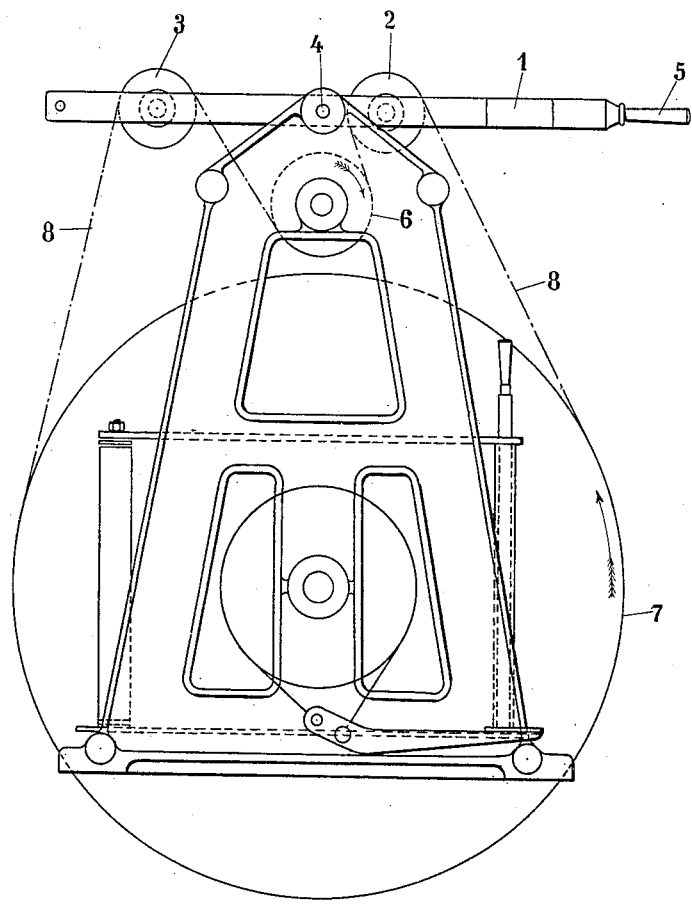
Witnesses:
Inventor:

UNITED STATES PATENT OFFICE.

FRITZ WINDHOFF, OF RHEINE, GERMANY.

BELT-TENSIONING DEVICE.

945,661.     Specification of Letters Patent.     Patented Jan. 4, 1910.

Application filed October 12, 1909. Serial No. 522,239.

*To all whom it may concern:*

Be it known that I, FRITZ WINDHOFF, a citizen of the German Empire, residing at Rheine, Germany, have invented a certain new and useful Belt-Tensioning Device, and do hereby declare the nature of this invention and in what manner the same is to be performed to be particularly described in and by the following statement.

In driving mechanism where the shafts are at slight distances apart as for example in winches and the like, tooth wheels are mostly used for the transmission of power. As driving mechanism of this kind has in most cases considerable difference in the gearing ratio in the different gears, when belt gearing is employed the arc of contact of the small pulley is only very small. It is therefore necessary to put the belt under tension by means of tension devices and at the same time to provide so that the arc of contact becomes larger. With the known devices hitherto employed for the purpose indicated there is the disadvantage that considerable power is necessary for putting the belt under tension, and further it is difficult to disengage the belt by simply releasing the tension rollers and loosening the same. The employment of a fast and loose pulley for effecting disengaging is on the other hand not always possible by reason of the restricted construction of the winches or the like.

In order to obviate the disadvantages mentioned, the tension devices which at the same time act as disengaging devices are arranged according to the present invention in such a manner that with a small expenditure of power, they put the belt under tension so that the pulley to be driven is actuated therewith.

In the drawing the figure illustrates one form of the invention diagrammatically represented.

On the frame of the winch a lever 1 with a handle 5 is pivoted at 4. On the lever two tension rollers 2, 3 or the like are suitably provided. The pulley 6 which is always driven in the direction indicated by the arrow is connected by means of a belt 8 with the pulley 7 to be driven. The tension rollers, 2, 3 are now arranged at different distances from the pivot 4 of the lever, the tension roller 3 being farther from the fulcrum of the lever than the roller 2. If the lever 1 be now lowered by means of the handle, the belt 8 is put under tension by means of the rollers 2, 3 and the pulley 7 is actuated therewith. The moment about the pivot 4 produced by the tension of the belt on the roller 3 is greater than that produced by the tension of the belt on the roller 2 so that a slight pressure on the handle of the lever puts the belt under tension. Thus the requisite pressure needs to be only sufficient to compensate the difference between the two moments, similarly to the action of a differential brake. If the lever is released the roller 3 moves downward and the belt is slackened. By the described arrangement of the tension rollers there is a further advantage viz., that the arc of contact of the driving pulley is always larger when the tension device is tightened and inversely becomes smaller when the belt is slackened.

Having now particularly described and ascertained the nature of my said invention and in what manner the same is to be performed, I declare that what I claim is:—

In combination with a belt and its pulleys, a lever pivoted intermediate its ends to a fixed support above the pulleys, and rollers carried by said lever one on each side of the pivot, one roller being located nearer the pivot than the other, said rollers receiving the belt, substantially as described.

In testimony whereof I have signed my name to this specification in the presence of two subscribing witnesses.

FRITZ WINDHOFF. [L. s.]

Witnesses:
  OTTO KÖNIG,
  WILLY KLEIN.